Nov. 5, 1940.  J. A. MURDOCK  2,220,169
KITCHEN UTENSIL AND METHOD OF MOUNTING BLADES
Filed Nov. 3, 1939
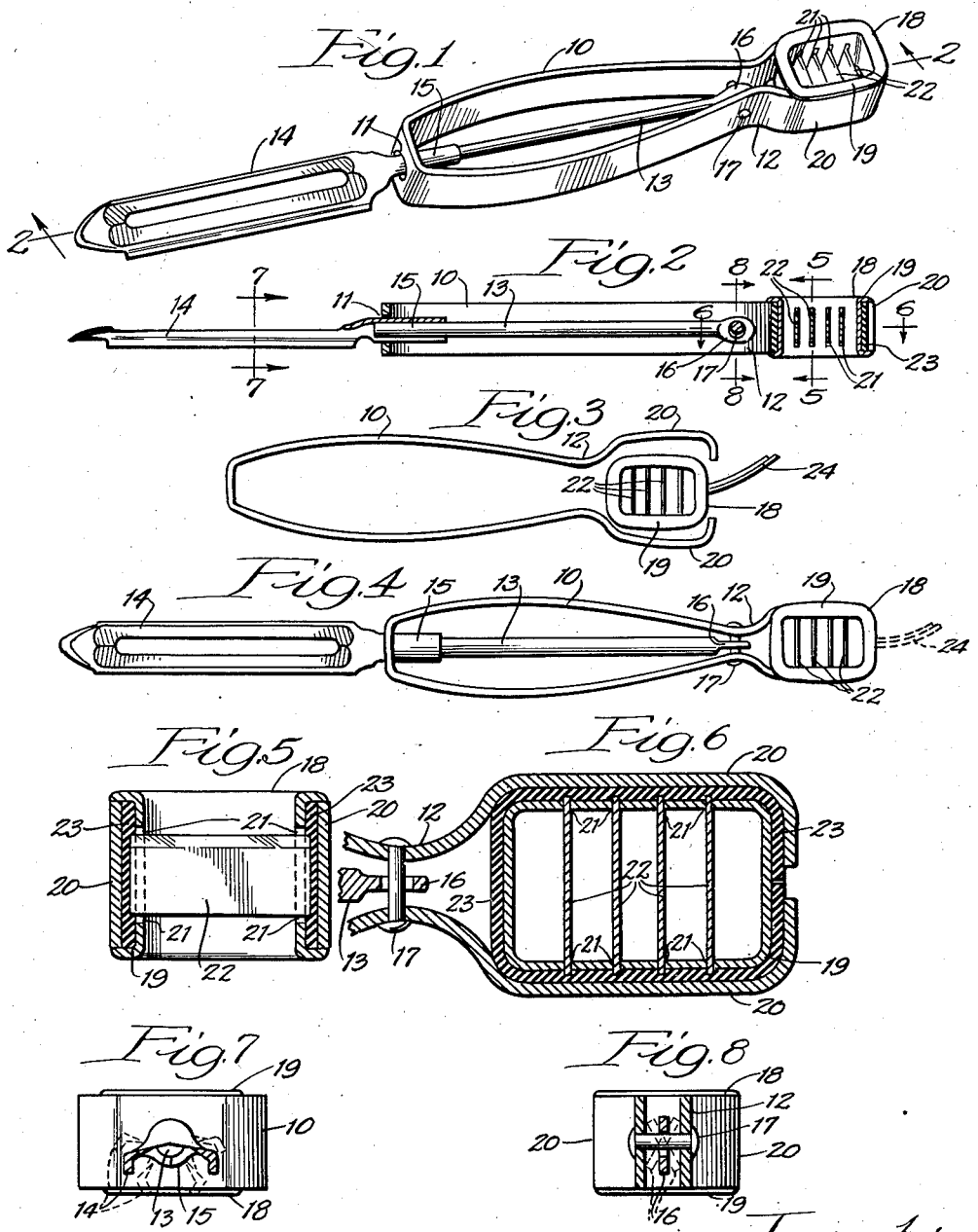
Inventor:
James A. Murdock,
By Casper W. Ooms
Attorney.

Patented Nov. 5, 1940

2,220,169

UNITED STATES PATENT OFFICE 2,220,169

KITCHEN UTENSIL AND METHOD OF MOUNTING BLADES

James A. Murdock, Chicago, Ill.

Application November 3, 1939, Serial No. 302,667

5 Claims. (Cl. 30—305)

This invention relates to kitchen utensils having a plurality of blades mounted in one end thereof for slicing elongated vegetables and similar articles, and a partially rotatable blade at the other end thereof for paring and shredding vegetables.

Other objects of the invention are to provide an improved kitchen utensil of this type which can be cheaply and easily constructed, and to provide a method of mounting the multiple blades easily and firmly in the knife in spite of variations in the dimensions of the blades.

A further object is to provide a paring knife of this type in which the partially rotatable blade can be mounted and retained in rotatable relation to the blade handle by means of a single rivet passing through the blade shaft.

Other objects of the invention will appear in the following description of a preferred embodiment thereof taken in conjunction with the accompanying drawing, in which—

Fig. 1 is a perspective view of my improved kitchen utensil;

Fig. 2 is a sectional elevation thereof taken on the line 2—2 in Fig. 1;

Fig. 3 is a plan view of the kitchen utensil handle about to be assembled about the multiple blade slicer assembly;

Fig. 4 is a plan view of the kitchen utensil assembled and indicating the removal of the excess of the multiple blade mounting band;

Fig. 5 is a transverse sectional detail of the multiple blade assembly, the section being taken on the line 5—5 of Fig. 2;

Fig. 6 is a horizontal sectional detail of the multiple blade assembly and the neck of the kitchen utensil, the section being taken on the line 6—6 of Fig. 2;

Fig. 7 is an end view of the kitchen utensil showing the manner in which the paring blade of the kitchen utensil can be swung about its longitudinal axis; and Fig. 8 is a transverse sectional detail view of the neck of the kitchen utensil, the section being taken on the line 8—8 of Fig. 2.

Referring to the drawing, the kitchen utensil comprises a handle 10 which may be formed of a strap of metal bent into the form of an elongated loop open at one end, as shown in Fig. 3. The handle is perforated at the closed end with a circular hole 11, designed to serve as a journal for the shaft of the partially rotatable paring blade. The two sides of the handle are bent inwardly to form the neck 12 near the open end of the handle. Beyond the neck 12 the two sides of the handle extend as free ends 20, formed as shown.

Projecting from the closed end of the handle is an elongated paring blade formed of the shaft 13 and the blade 14. The shaft 13 may be formed integrally with the blade member 14, or, as shown, in two parts, fixedly secured together at the inner end of the blade which is formed into a tubular socket 15 to embrace one end of the shaft 13. The socket 15 also serves as a bearing within the journal 11, upon which the blade can be rotated.

While the blade 14 has been shown as a cradle-shaped slotted blade with the edges of the slot formed into cutting edges, any blade of suitable shape can be used.

The end of the blade shaft 13 not affixed to the blade is flattened and perforated, as shown in Figs. 2, 4 and 6, to form the ear 16. In the preferred form shown, for convenience of assembly, the ear is made sufficiently small as to permit it to pass through the hole 11 in the end of the handle 10.

Passing through the handle neck 12 and through the blade shaft ear 16, is a rivet 17, which is peened at both ends to secure the sides of the handle 10 together. The diameter of the rivet, as shown in Figs. 6 and 8, is substantially less than the diameter of the perforation in the ear 16, thus permitting the ear to tilt about the rivet as shown in Fig. 8.

At the open end of the handle 10, beyond the neck 12, is mounted a multiple blade slicer 18. The frame of this slicer is shown as constructed of a generally rectangular ferrule 19, formed to be snugly embraced by the free ends 20 of the sides of the handle 10. This ferrule is slotted with a plurality of slots 21 cut through both sides, designed to receive the blades 22 of which the embodiment shown contains four. While the blades shown have only the upper edge sharpened, it is contemplated that both edges of the blades may be sharpened.

To facilitate assembly, and because of inevitable variations in the dimensions of the blades employed, the slots 21 are made sufficiently large to furnish clearance for the blades 22. To render the blades stationary after they are mounted in the ferrule 19, a filler or band 23 of plastic or compressible material which will yield locally under pressure but maintain its form and serve to fix the position of the blades 22 is applied to the side wall of the ferrule 19.

In the preferred embodiment shown, the band 23 is illustrated as completely encircling the ferrule 19, and in that form the band is most easily applied. However its function can be performed by two short filler strips of the proper material run between the sides of the ferrule 19 and the side walls of the handle ends 20 so as to cover the slots 21.

The band 23 may be made of soft metal, wood, leather, fabric, rubber or various plastic and cementitious materials. It is necessary that this material be compressible or yielding at the time of assembly of the kitchen utensil, although it is immaterial whether it hardens thereafter. In the drawing the band is shown composed of rubber tape, a familiar commercial article made of soft rubber formed into strips which will adhere to surfaces to which it may be applied. If the band employed is used in this form it can be readily applied by running the strip around the ferrule 19 with the blades 22 mounted therein and the ends 24 pinched together to retain the blades 22 in the slicer assembly 18 until the entire kitchen utensil is assembled. The ends 24 also provide a convenient ear for handling the slicer assembly 18 until the article is completed.

Assembly of the kitchen utensil

The kitchen utensil in the form shown may be most conveniently assembled in the following manner:

A slicer assembly 18 is made up by inserting the requisite number of blades 22 in the slots 21 of the ferrule 19. The plastic band 23 is then applied to the body of the ferrule 19, and the ends 24 of the band pinched together to retain the blades in the ferrule 19. This assembly is shown in Fig. 3.

The slicer assembly 18 is then placed between the free ends 20 of the handle 10 (as shown in Fig. 3) and the handle gripped so that the ends 20 snugly embrace the slicer assembly 18, leaving the ends 24 of the plastic band protruding. Because of the compressible nature of the band 23, pressure upon the handle 10 forces the ends of the blades 22 into the material and fixes the positions of the respective blades.

The paring blade 14, affixed to the shaft 13, is then mounted in the handle 10 by passing the shaft through the hole 11 in the end of the handle, until the ear 16 on the end of the shaft is between the perforations in the throat 12 of the handle 10. A rivet 17 is then passed through the sides of the handle and the ear 16 of the blade, and riveted in place. This completes the assembly and the ends 24 of the plastic band 23 may be torn off.

Manner of operation

In use, the kitchen utensil may be held and operated like a paring knife, the elongated blade 14 serving as a swiveled blade. The rivet 17 holds the blade shaft 13 longitudinally, but permits it to rotate, as shown in Figs. 7 and 8, about a quarter of a revolution, due to the fact that the hole in the ear 16 is substantially larger in diameter than the rivet 17. The blade is thus permitted to follow the irregular surface of the object being pared.

The slicer 18 may be used to slice elongated objects, such as beans, carrot strips, etc., by forcing the end of the object against the sharp edges of the blades 22 and through the slicer. After the sliced ends of the object project beyond the slicer, they may be grasped and the object drawn through to complete the operation.

Although the invention has been described in connection with specific details of a preferred embodiment thereof, it must be understood that such details are not intended to be limitative of the invention except as set forth in the accompanying claims.

Having thus described my invention, I declare that what I claim is:

1. A slicer composed of a handle member, a frame embraced by said handle member, slots in said frame, a plurality of blades passing through said slots, and a compressible strip between said frame and said handle member in contact with said blades.

2. A slicer comprising a handle member, a frame within said handle member, slots in the sides of said frame, a plurality of blades having ends within said slots, a compressible strip compressed between and in contact with the sides of said frame and said handle member.

3. A slicer comprising a handle member, a ferrule gripped by said handle, slots in the sides of said ferrule, blades projecting through said slots, a compressible strip between said ferrule and said handle and in contact with said blades.

4. The method of mounting multiple blades in a slicer, comprising the insertion of said blades in a frame adapted to hold said blades loosely and to permit the ends of said blades to project from said frame, applying a compressible filler to the sides of the frame and the ends of said blades projecting therefrom, and compressing said filler by clamping a rigid member against the sides of the frame to which the compressible filler has been applied.

5. The method of mounting multiple blades in a slicer, comprising the mounting of said blades in a frame with the ends of said blades held in slots in the sides of the frame, applying a compressible filler to the exterior of the frame, and clamping a rigid member over the sides of the frame and the blade ends to compress the filler between the frame and the rigid member.

JAMES A. MURDOCK.

CERTIFICATE OF CORRECTION.

Patent No. 2,220,169. November 5, 1940.

JAMES A. MURDOCK.

It is hereby certified that error appears in the printed specification of the above numbered patent requiring correction as follows: Page 1, first column, line 10, for the words "the multiple" read --a plurality of--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.